United States Patent [19]

Herzl

[11] 4,181,020
[45] Jan. 1, 1980

[54] VORTEX-SHEDDING FLOWMETER HAVING A SENSING VANE

[75] Inventor: Peter J. Herzl, Morrisville, Pa.

[73] Assignee: Fischer & Porter Co., Warminster, Pa.

[21] Appl. No.: 944,624

[22] Filed: Sep. 21, 1978

[51] Int. Cl.² ............................................. G01F 1/32
[52] U.S. Cl. ............................................. 73/194 VS
[58] Field of Search ................................. 73/194 VS

[56] References Cited

U.S. PATENT DOCUMENTS

| 3,116,639 | 1/1964 | Bird ........................................ 73/194 |
| 4,069,708 | 1/1978 | Fussell, Jr. ............................. 73/194 |

FOREIGN PATENT DOCUMENTS 823684  11/1959  United Kingdom ...................... 73/194

Primary Examiner—Herbert Goldstein
Attorney, Agent, or Firm—Michael Ebert

[57] ABSTRACT

A vortex-shedding flowmeter in which a shedder is transversely mounted in a flow tube through which the fluid to be metered is conducted, the shedder dividing the flow and causing vortices to be shed alternately on either side thereof at a repetition rate proportional to flow rate, thereby producing downstream trains of vortices moving along the right and left sides of the tube. The wave span between the eyes of successive vortices in the trains has a substantially constant length determined by the geometry of the shedder. At a downstream position in the flow tube is a vane flanked by the trains of vortices and having a length no less than one-half the length of the span and no greater than the full length thereof. The vane is pivoted on a torsion shaft on its central axis which is perpendicular to the tube axis and is balanced with respect thereto. The moving vortices on either side of the vane produce fluidic forces giving rise to alternate clockwise and counterclockwise torques, causing the vane to vibrate at a frequency in accordance with the repetition rate. These vibrations are sensed to provide an output signal indicative of flow rate.

10 Claims, 9 Drawing Figures

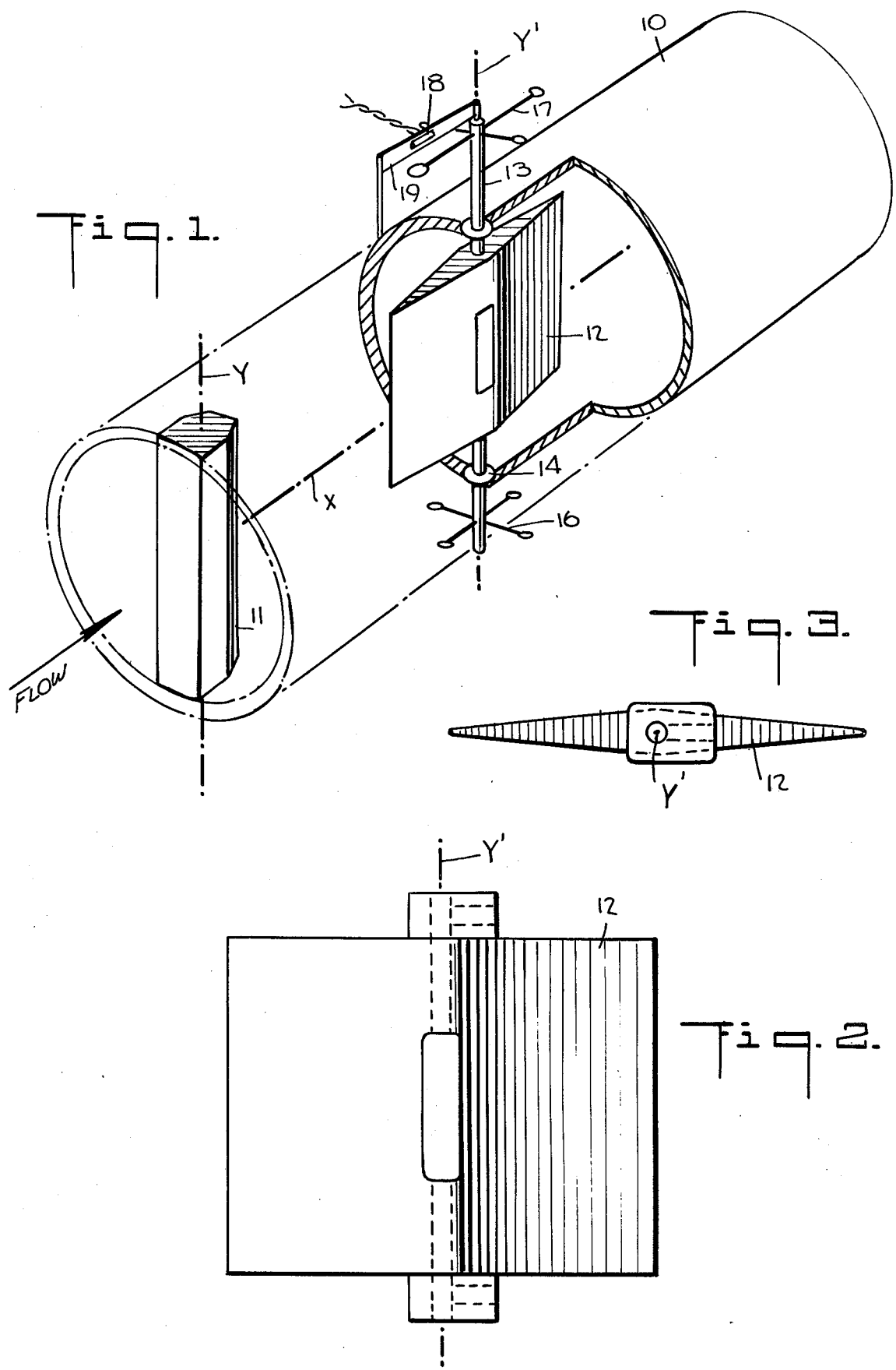

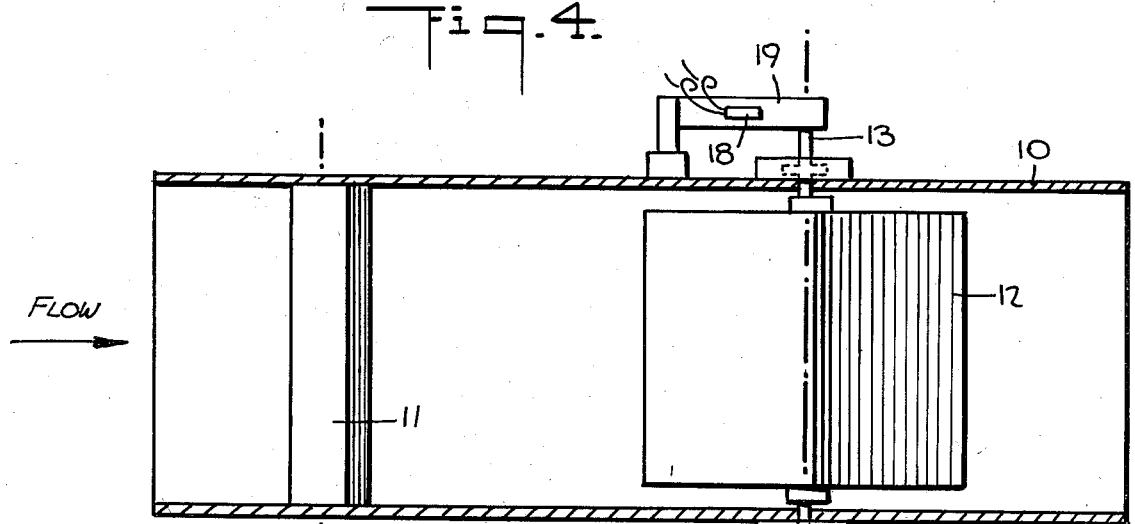
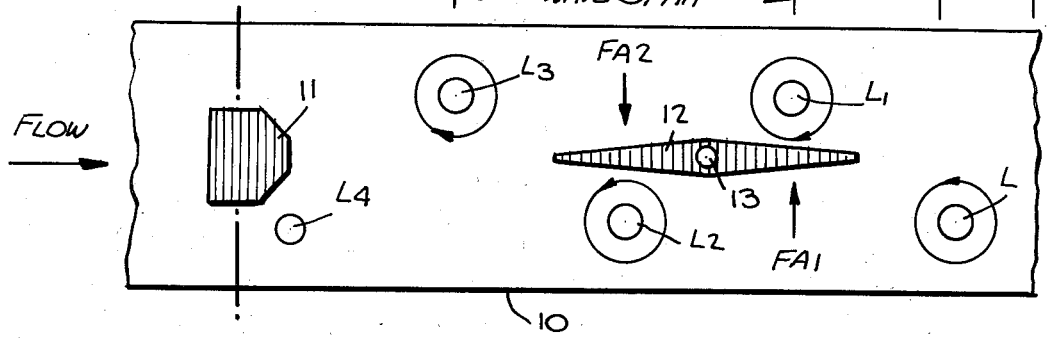
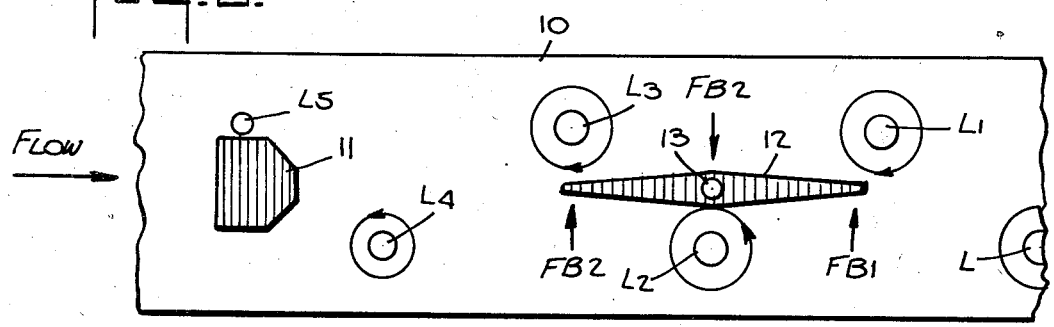
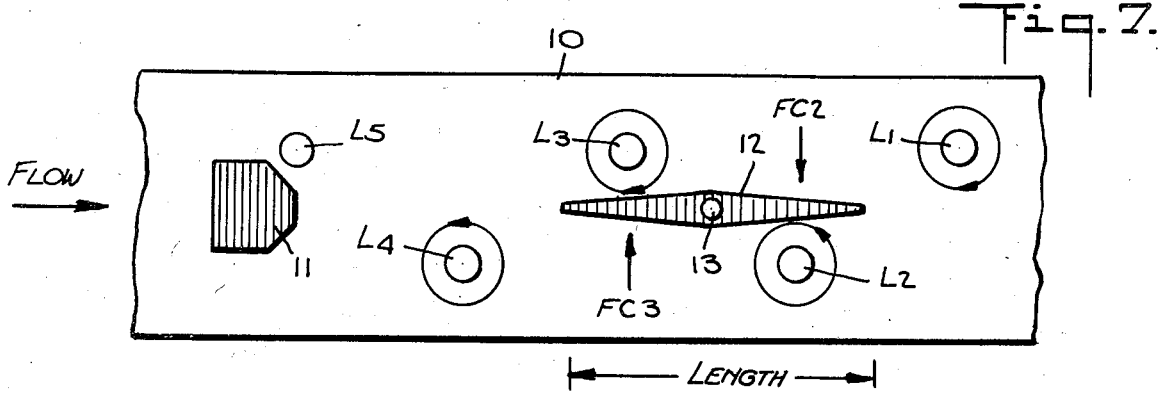

VORTEX-SHEDDING FLOWMETER HAVING A SENSING VANE

BACKGROUND OF INVENTION

This invention relates generally to flowmeters of the vortex-shedding type, and more particularly to a flowmeter wherein fluid oscillations produced by a shedder cause a torsionally-mounted sensing vane to vibrate at the same rate, the vane having a low moment of inertia whereby the frequency response of the vane is good even at high frequencies.

In many industrial processes, one must be able to measure the volumetric flow of fluids being treated or supplied in order to carry out various control functions. It is also necessary, in some instances, to determine the mass flow of the fluids. Existing types of vortex-shedding flowmeters are capable of effecting volumetric flow or mass flow measurement.

The operation of a vortex-shedding flowmeter is based on the fact that under certain circumstances the presence of an obstacle in a flow conduit will give rise to periodic fluidic vortices. For small Reynolds numbers, the downstream wake is laminar in nature, but at increasing Reynolds numbers, regular vortex patterns are formed, these being known as Karman vortex streets. The repetition rate at which vortices are shed in a Karman vortex street is a function of flow rate. In order to convert a volumetric reading to a reading of mass flow, one must multiply the volume measurement by the density of the fluid being metered.

In the Burgess U.S. Pat. No. 3,888,120, the obstacle assembly mounted in a flow tube through which the fluid to be metered is conducted is constituted by a front bluff body fixedly mounted across the tube and a deflectable rear section cantilevered from the front section by means of a flexible beam to define a gap serving to trap the Karman vortices. In normal operation, the flow of fluid past the obstacle assembly produces vortex shedding, giving rise to a fluidic force which alternates from one side of the deflectable section to the other, thereby causing this section to vibrate at a frequency proportional to flow rate.

In the Vortex Flowmeter Model 10 LV 1000 manufactured by the Fischer and Porter Company of Warminster, Pennsylvania, the assignee of Burgess U.S. Pat. No. 3,888,120 as well as of the present application, a strain-gauge sensor is used to detect the deflection of the rear section in relation to the fixed front section of the obstacle assembly. The characteristics of this sensor are such as to give rise to substantial resistance changes as the rear section is deflected, so that the sensor is highly sensitive and produces an electrical signal whose amplitude and frequency depend on flow rate.

In other known forms of vortex flowmeters, instead of a deflectable rear section which is cantilevered from a fixed front section to sense the vortices, such as meters of the type disclosed in the above-identified Burgess patent and in Herzl patent 4,062,238, use is made of a pivoted vane which occupies a downstream position in the flow tube and is caused to vibrate at a rate determined by the frequency of the fluidic oscillations. In this meter, the vane is physically independent of the shedder or flow obstacle. Sensing vanes of this type are disclosed in the Fussell, Jr. U.S. Pat. No. 4,069,708 and in the Bird U.S. Pat. No. 3,116,639.

The frequency response of a vortex-shedding flowmeter in which a deflectable section or a pivoted vane is excited into vibration varies in accordance with the square root of the actuating force produced by the fluidic oscillations divided by the square root of the moment of inertia. The moment of inertia of a body such as a pivoted vane or a deflectable section, with reference to its axis of rotation, is the sum of the masses of all of its component parts, each multiplied by a second power of its distance from the axis of rotation.

Thus the moment of inertia of a body depends upon the distribution of its matter as well as upon its mass. For example, if two wheels have exactly the same diameter and the same mass, but in one the mass is concentrated near the periphery and is therefore far from the axis of rotation, whereas in the other, the mass is distributed between the periphery and the axis, the first wheel will have a much greater moment of inertia.

Because existing forms of deflectable sections and pivoted vanes in vortex-type flowmeters to sense fluidic oscillations have a relatively high moment of inertia, their frequency response, especially in the high frequency portion of the operating range, is poor. This drawback may not be significant when measuring low velocity flows, but it becomes serious in gas metering situations where relatively high velocities such as 100 ft.-per-second are normally encountered.

Thus in a vortex-shedding flowmeter having a one and one-half inch diameter, a gas velocity of 100 ft.-per-second results in a fluidic shedding frequency of about 700 Hz. Unless the moment of inertia of the deflectable section or pivoted vane is low, it is very difficult to follow this very high frequency, and since known forms of these sensing elements have a high moment of inertia, their response at high frequencies is unsatisfactory.

It is also important in a vortex flowmeter in which a deflectable section or pivoted vane is excited into vibration in accordance with the frequency of fluidic oscillation that the natural resonance frequency of the sensing element be higher than the maximum frequency in the operating range. In this way, mechanical resonance peaks are avoided, so that the amplitude of the vibratory motion accurately reflects the amplitude of the fluidic oscillations.

Since the resonance frequency of a vibratory element varies as the square root of its stiffness of rotation divided by the square root of its moment of inertia, with existing types of sensing elements which have a high moment of inertia, this creates a problem; for the resonance frequency of such elements approaches or falls within the operating frequency range of the vortex flowmeter.

SUMMARY OF THE INVENTION

In view of the foregoing, the main object of this invention is to provide an improved vortex-shedding flowmeter in which fluidic oscillations are sensed by means of a pivoted vane that is inherently balanced with respect to its axis of rotation, the vane having a low moment of inertia whereby the meter has a good frequency response, especially in the high frequency portion of the operating range.

A significant advantage of a pivoted vane arrangement in accordance with the invention is that it makes possible accurate and reliable metering of gas flows where the operating frequencies run as high as 700 to 800 Hz. Moreover, because of its good frequency response, the meter is usable for both gas and liquid measurement.

More particularly, it is an object of this invention to provide a vortex-shedding flowmeter in which the balanced vane is pivoted in a torsional suspension that allows only microscopic vane motion, all motion being absorbed in the flexing components, thereby avoiding sticking problems of the type encountered with bearing-mounted vanes having sliding seals.

Yet another object of this invention is to provide a vibratory vane arrangement responsive to fluidic oscillations and having a natural resonance frequency well outside the operating range of the vortex meter.

Briefly stated, these objects are attained in a vortex shedding flowmeter in which a shedder disposed transversely in the flow tube acts to divide the fluid conducted therethrough and causing vortices to be shed alternately on either side thereof to produce moving downstream trains of vortices on either side of the tube. The wave span between the eyes of successive vortices in the trains has a substantially constant length determined by the geometry of the shedder. At a downstream position in the flow tube is a vane flanked by the trains of vortices and having a length no less than one-half the length of the span and no greater than the full length thereof. The vane is pivoted on a torsion shaft on its central axis which is perpendicular to the tube axis and is balanced with respect thereto. The moving vortices on either side of the vane produce fluidic forces giving rise to alternate clockwise and counterclockwise torques, causing the vane to vibrate at a frequency in accordance with the repetition rate. These vibrations are sensed to provide an output signal indicative of flow rate.

OUTLINE OF DRAWINGS

For a better understanding of the invention as well as other objects and further features thereof, reference is made to the following detailed description to be read in conjunction with the accompanying drawings, wherein:

FIG. 1 is a schematic view, in perspective, of a vortex-shedding flowmeter which includes a sensing vane in accordance with the invention;

FIG. 2 is an elevational view of the vane included in the flowmeter;

FIG. 3 is a plan view of the vane;

FIG. 4 is a longitudinal section taken through the flowmeter;

FIG. 5 is a schematic view of the flowmeter illustrating the relationship between vortices generated therein and the vane at one point in time;

FIg. 6 is the same as FIG. 5, but at a later point in time;

FIG. 7 is the same as FIG. 5, but at a still later point in time;

DESCRIPTION OF INVENTION

Meter Structure

Figure 8A:
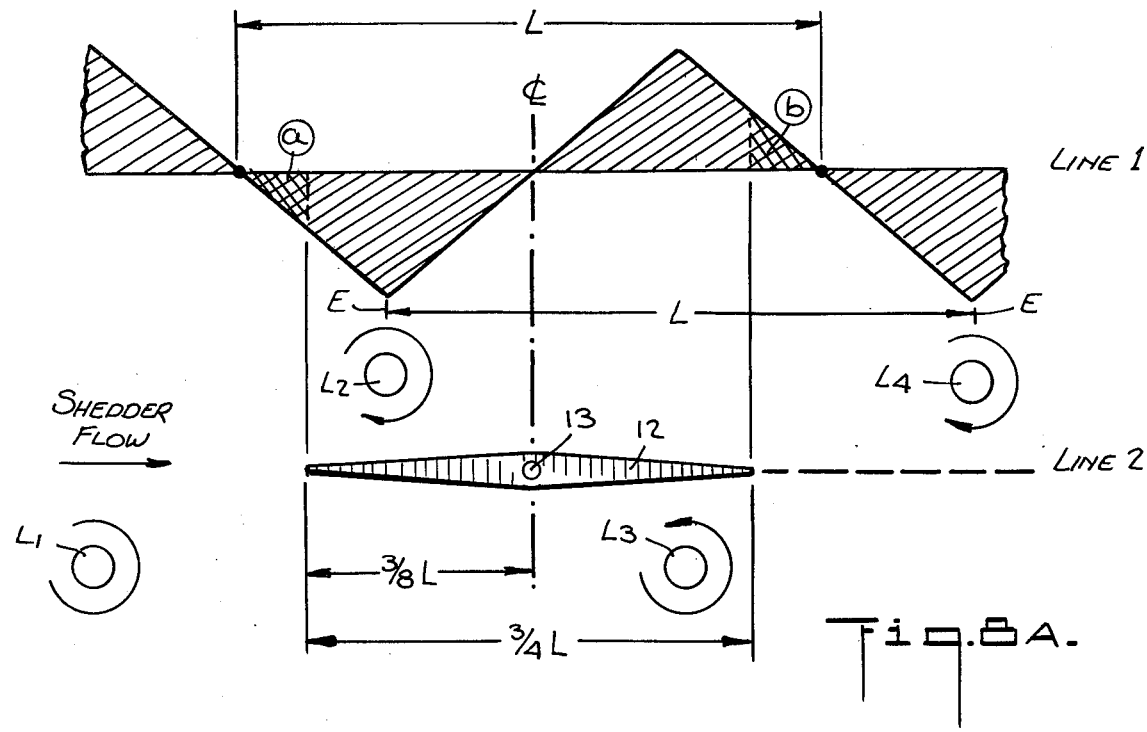
FIG. 8A illustrates the relationship between a vane whose length is shorter than that in FIG. 1 with vortices under conditions creating maximum torque.

Referring now to FIGS. 1 to 4, there is shown a flowmeter of the vortex-shedding type in accordance with the invention, the meter including a flow tube 10 which, in practice, is interposed in the line carrying a liquid or gas whose flow is to be metered.

Mounted transversely within flow tube 10 (shown as having a circular cross-section), is a bluff body or shedder 11 having a generally square cross-section, the rear corners of the block being bevelled. The long axis Y of the block is perpendicular to the longitudinal flow axis X of the tube. Incoming flow which impinges on shedder 11 is divided thereby, producing fluidic perturbations in the form of a Karman vortex street. The shedder may be in any known form and having a geometry of the type disclosed in the above-identified patents.

Mounted transversely at a downstream position in tube 10 is a vane 12 having a diamond-shaped cross-section, the vane being pivotally supported on a shaft 13 which passes through the exact center of the vane along an axis Y' parallel to axis Y and perpendicular to flow axis X. The vane is statically and dynamically balanced with respect to axis Y', and, as best seen in FIG. 3, has a sharply tapered leading edge and a similarly-tapered trailing edge, the edges being symmetrical with respect to the pivot axis. In practice, the vane may be fabricated of a metal such as aluminum or titanium which is nonreactive with respect to all fluids being metered, or of a high-strength, light-weight synthetic plastic material which is chemically immune to these fluids. Since the mass distribution of the vanes is such that most of the mass is close to the axis of rotation, the vane has a low moment of inertia.

Pivot shaft 13 on which the vane is supported projects at either end through the walls of flow tube 10 into shaft supports. These supports are sealed with "O" rings 14 and 15 of elastomeric material, such as neoprene, and torsional suspensions 16 and 17 formed by wires of resilient metal such as piano wire which extend between the shaft and fixed anchors. These torsional suspension components limit pivot shaft motion at maximum torque to a microscopic motion on the order of a half micron at the "O" ring positions. Torsional suspension of shaft 13 may be effected by other means such as a hollow metal tube of flexible material.

To sense the microscopic vibratory motion of the vane, a sensor in the form of a strain gauge 18 is mounted on a resilient beam 19, one end of which is attached to the shaft 12 and the other to a fixed anchor whereby deformation of the beam resulting from a slight motion of the shaft is translated by gauge 18 into a corresponding electrical signal. Thus as the vane vibrates about its axis in accordance with the fluidic oscillations, a signal having the same frequency is generated which is indicative of flow rate. In practice the transducer to convert vibratory motion into an electrical signal may be a piezoelectric, a semi-conductor or a wire strain gauge, or any suitable inductive, capacitive or any other micro-motion or strain sensor.

METER OPERATION

Referring now to FIG. 5, there is shown schematically the relationship between vortices generated in the vortex meter by shedder 11 and the vane 12 which is positioned downstream in the flow tube. Shedder 11 divides the incoming flow to produce vortices alternately on one side and then on the other side of the flow tube at a repetition rate proportional to the flow tube. As a result of this shedding action, a moving train of vortices travels on the right side and a moving train of vortices travels on the left side of the tube, which trains flank the opposite sides of vane 12.

FIG. 5 shows vortices L, $L_1$, $L_2$, $L_3$ and $L_4$, the last vortex being in the process of development. Thus vortex L is farthest downstream on the right side of tube 10, the next vortex $L_1$ is on the left side, followed by vortex $L_2$ on the right side and vortex $L_3$ on the left side, and finally vortex $L_4$ on the right side. Hence the left side of vane 12, we have a moving train of vortices $L_1$ and $L_3$, while on the right side there is a moving train of vortices L, $L_2$ and $L_4$ both travelling downstream in the tube.

The wave span between the eyes of successive vortices in either train, such as the span between the eyes of vortices $L_1$ and $L_3$ in the left train, has a substantially constant length determined by the geometry or characteristics of the shedder. For a given vortex-shedding meter, this wave span is equal to the velocity of fluid in the meter divided by the repetition rate of the vortices. For example, if in a given meter the characteristics of the shedder are such that for a flow velocity of 10 feet per minute, the resultant vortices have a repetition rate of 50 Hz, then the wave span is equal to 10 divided by 50, which is 0.2 feet. Since in a linear flowmeter, an increase in fluid velocity results in a proportionally higher repetition rate, the ratio between velocity and repetition rate remains the same throughout the operating range of the meter and the wave span is therefore constant.

The critical feature of the present invention is that the total length of vane 12 from tip to tip is no less than one half of the length of the wave span and no more than the full length thereof; hence the length of the vane must fall within this size range. Vane 12, shown in FIGS. 5, 6 and 7, has a length which is about equal to that of the wave span; hence this vane represents the longest acceptable vane. In practice, however, as will later be explained, other vane lengths within the specified range may be used, and, in fact, distinct advantages are gained by using lengths which lie between the upper and lower limits of the specified size range.

When the critical relationship exists between the wave span and the vane, the low pressure generated by vortex $L_1$ on the right side, at the point in time represented by FIG. 5, produces a fluidic force $FA_1$ which is applied to the trailing edge of vane 12 at its left side; whereas the low pressure generated by vortex $L_2$ on the left side produces an equal and opposite force $FA_2$ which is applied to the right side of the leading edge of the vane.

Forces $FA_1$ and $FA_2$ together generate a counterclockwise torque around pivot shaft 13. And because these forces are exerted in opposite directions, no side force is imposed on pivot shaft 13.

FIG. 6 shows the same trains at a later point in time after the vortices have moved somewhat further downstream in the flow tube. Now the eyes of vortices $L_1$ and $L_2$ in the right train are in line with the tips of vane 12 in that the length of the wave span between these eyes is just about equal to the length of the vane. As a consequence, forces $FB_1$ and $FB_3$ are produced, both of which are exerted on the tips in the same direction. Because force $FB_1$ seeks to effect counterclockwise motion, while force $FB_3$ seeks to effect clockwise motion, and these forces have equal strength, they cancel each other out and no torque is generated.

Force $FB_2$ produced by vortex $L_2$ in the right train is directed toward pivot 13 and does not, therefore, generate a torque. And since forces $FB_1$ and $FB_3$ at the tips are developed by only half of vortices $L_1$ and $L_3$ and are therefore half strength; whereas force $FB_2$ is generated by the full vortex $L_2$, it follows that $FB_1+FB_2=FB_2$; hence no side force is produced.

FIG. 7 is taken at a still later point in time, the trains having moved further downstream. Now vortex $L_4$ is fully developed, whereas the fifth vortex $L_5$ on the right side of the tube is in the state of development. In this condition, vortex $L_2$ generates a force $FC_2$ which is imposed on the trailing edge of vane 12 in one direction, while vortex $L_3$ generates a force $FC_3$ which is imposed in the opposite direction on the leading edge to produce a clockwise torque about pivot 13. Since forces $FC_2$ and $FC_3$ are equal and opposite, no side force toward the wall is generated.

It will be evident from the foregoing that as the right and left trains of vortices pass by the sensing vane on either side thereof, a torque is developed which undergoes sinusoidal change from clockwise to counterclockwise, no side force toward a wall being generated at any point in the full cycle.

The present vane-sensing arrangement offers several advantages over known forms of pivoted vane or trail structures. The system is inherently well-balanced since the vane structure is essentially symmetrical with respect to its central pivot axis. While a balanced vane has obvious functional and structural advantages, it is particularly useful in gas metering systems, for the gas densities are much lower than liquid densities, resulting in much lower vortex forces.

Because the diamond-shaped vane has its weight concentrated near the neutral axis at the center of the body, the vane is inherently strong and is characterized by a low moment of inertia. This characteristic has particular value in metering where the pipeline velocities are normally high and the rate of vortices passing the sensing vane is correspondingly high.

Also, for a given stiffness of suspension, the vane has a high resonance frequency well above the operating frequency; for a low moment of inertia results in a high resonance frequency. Inasmuch as the vane is longer than pivoted vanes of the type heretofore known, it does a great deal more averaging than the prior designs and tends, therefore, to yield better signal quality. Also, the larger sensing area causes larger forces to be generated.

SHORTER VANE

In the arrangement shown in FIGS. 5 to 7, the length of the vane is about equal to the wave span and is therefore of maximum acceptable size. It will now be shown why a further reduction in the moment of inertia accompanied by an enhanced frequency response is obtainable with a vane whose length is three-quarters of the wave span.

In FIG. 8A, there is shown on line 2 a vane 12' which is pivoted on a central shaft 13, the total length of the vane being $\frac{3}{4}$ L, where L is the wave span as measured between the eyes E of successive vortices $L_2$ and $L_4$ in the right train. Thus the leading edge of the vane has a length $\frac{3}{8}$ L and the trailing edge the same length.

Line 1 of FIG. 8A illustrates the forces acting on the vane in this position, the forces $FL_2$ and $FL_3$ being produced by vortices $L_2$ and $L_3$ on opposite sides of the vane. It will be seen from the amplitude wave forms of these forces that their amplitudes are at peak value at the eyes of the vortices.

The cross-hatched sections a and b of forces $FL_2$ and $FL_3$, respectively, represent those portions of these forces that go beyond the tips of the vane and are therefore not effective with respect to the vane. Had the vane been a full wave span in length, these portions would have been effective. However, it will be evident that force portions a and b are minor and the difference between a ¾ and a full wave span tail is relatively small in terms of the force-to-vane relationship.

On the other hand, since the moment of inertia varies as $(L)^4$, the use of a ¾ wave span reduces the moment to $(0.75)^4$ which equals 0.316. This reduction represents a very large change and therefore gives rise to a substantial improvement in frequency response.

Accordingly, while a vane length equal to about the length of a wave span is acceptable, the length of the vane is preferably less than a full wave span, but no shorter than one-half length.

Figure 8B:
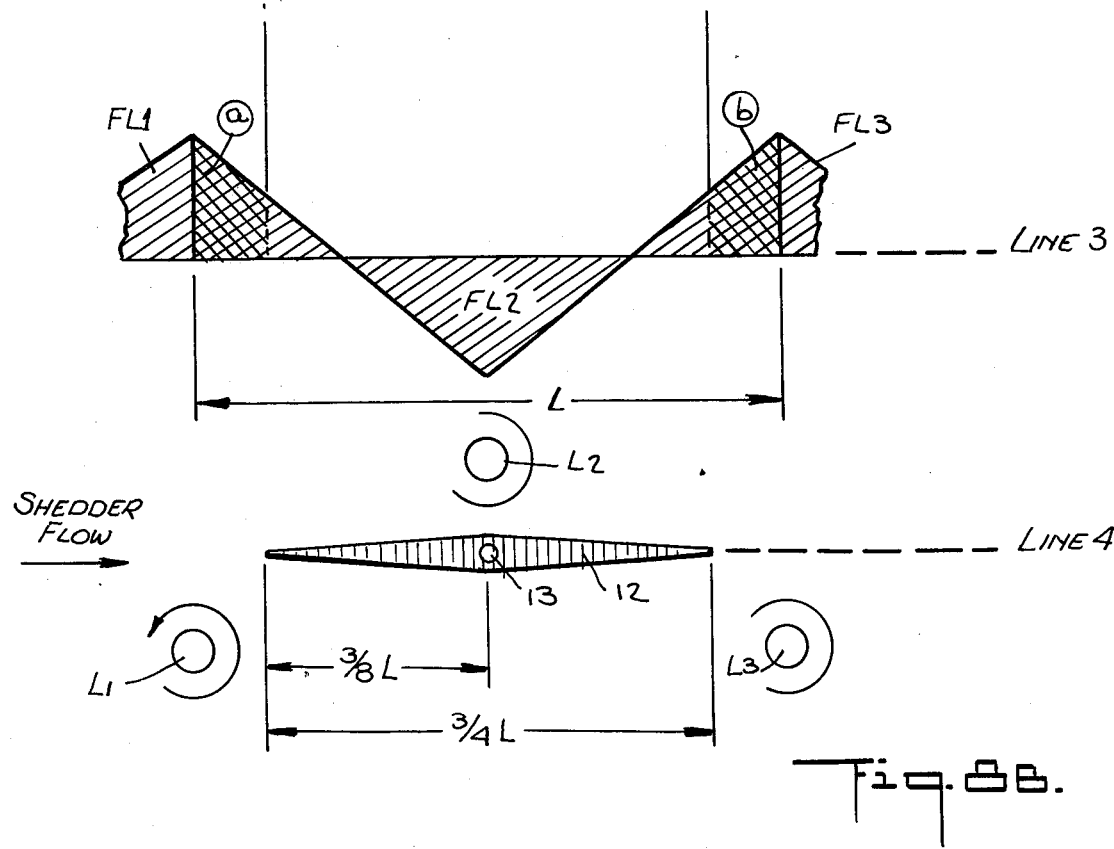
FIG. 8B shows the relationship between the same vane and vortices in a position creating zero torque.

FIG. 8B shows on line 4 the same ¾ length vane 12', with the vortices further downstream at a later point in time to create zero torque. Line 3 in FIG. 8 shows this condition. Now, a small portion of forces $FL_1$ and $FL_2$ produced by vortices $L_1$ and $L_2$ are imposed in the same direction and to the same extent on the leading and trailing tips of vane 12', while force $FL_2$ produced by vortex $L_2$ is imposed in the other direction on the center pivot 13 of the vane, so that no torque is generated. However, a small side force is generated by forces $FL_1$ and $FL_2$, but this is readily absorbed in the suspension components.

While there has been shown and described a preferred embodiment of a vortex-shedding flowmeter having a sensing vane in accordance with the invention, it will be appreciated that many changes and modifications may be made therein without, however, departing from the essential spirit thereof.

I claim:

1. A vortex-shedding flowmeter comprising:
   A. a flow tube through which a fluid to be metered is conducted along the axis of the tube;
   B. a shedder having a predetermined geometry transversely disposed in said tube to divide the flow therein and to cause vortices to be shed alternately on either side thereof at a repetition rate proportional to the flow rate of the fluid, thereby producing downstream trains of vortices moving along the right and left sides of the tube, the wave span between the eyes of successive vortices in each train having a substantially constant length determined by said geometry;
   C. a vane disposed in said tube between the left and right trains of vortices whereby vortices which pass along the left side of the vane impose forces on the right side thereof and vortices which pass along the right side of the vane impose forces on the left side thereof, said vane being pivoted on a shaft extending along a pivot axis which is normal to the tube axis, the body of said vane being symmetrical with respect to said pivot axis to define like leading and trailing edges, said vane having a length which is about three quarters the length of the wave span, whereby the forces imposed on the vane produce torques causing said vane to vibrate at a frequency in accordance with said repetition rate; and
   D. means operatively coupled to said vibrating vane to sense the vibrations thereof to produce a corresponding signal.

2. A flowmeter as set forth in claim 1, further including means to tortionally suspend the pivot shaft at either end whereby the vibration of said vane at maximum torque results in microscopic motion.

3. A flowmeter as set forth in claim 2, wherein the ends of said shaft extend through the wall of said tube and are provided with elastomeric "O" rings to seal said tube.

4. A flowmeter as set forth in claim 2, wherein said tortional suspension means are formed by resilient wires extending between said shaft and fixed anchors.

5. A flowmeter as set forth in claim 1, wherein said sensing means is constituted by a beam extending between one end of said shaft and a fixed point, and a strain gauge mounted on the beam to detect the deformation thereof.

6. A flowmeter as set forth in claim 1, wherein said vane has a structure providing a low moment of inertia.

7. A flowmeter as set forth in claim 6, wherein said vane has a diamond-shaped cross-section forming tapered leading edges.

8. A flowmeter as set forth in claim 6, wherein said vane is fabricated of synthetic plastic material.

9. A flowmeter as set forth in claim 6, wherein said vane is formed of aluminum.

10. A flowmeter as set forth in claim 6, wherein said vane is formed of titanium.

* * * * *